United States Patent
Karaoguz et al.

(10) Patent No.: US 8,077,992 B2
(45) Date of Patent: *Dec. 13, 2011

(54) APPLICATION BASED ADAPTIVE ENCODING

(75) Inventors: Jeyhan Karaoguz, Irvine, CA (US); James D. Bennett, Hroznetin (CZ)

(73) Assignee: Broadcom Corporation

( * ) Notice: Subject to any disclaimer, the term of this patent is extended or adjusted under 35 U.S.C. 154(b) by 0 days.

This patent is subject to a terminal disclaimer.

(21) Appl. No.: 12/774,871

(22) Filed: May 6, 2010

(65) Prior Publication Data

US 2010/0246985 A1   Sep. 30, 2010

Related U.S. Application Data

(63) Continuation of application No. 11/953,328, filed on Dec. 10, 2007, now Pat. No. 7,724,970, which is a continuation of application No. 10/875,969, filed on Jun. 24, 2004, now Pat. No. 7,319,795.

(60) Provisional application No. 60/505,190, filed on Sep. 23, 2003.

(51) Int. Cl.
 *G06K 9/36* (2006.01)
 *G06K 9/46* (2006.01)

(52) U.S. Cl. ........................................ 382/236

(58) Field of Classification Search .......... 382/173, 382/232, 233, 236, 238, 239, 248, 251, 253; 375/240.01, 240.08, 240.12, 240.16, 240.24; 348/192, 384.1, 397.1, 399.1, 404.1, 699; 341/63, 67; 370/232, 236

See application file for complete search history.

(56) References Cited

U.S. PATENT DOCUMENTS

| | | | |
|---|---|---|---|
| 5,874,996 A | 2/1999 | Shimokoriyama et al. | |
| 5,991,444 A * | 11/1999 | Burt et al. | 382/232 |
| 5,999,225 A | 12/1999 | Yagasaki et al. | |
| 6,052,414 A * | 4/2000 | Lee et al. | 375/240.16 |
| 6,124,811 A | 9/2000 | Acharya et al. | |
| 6,380,986 B1 * | 4/2002 | Minami et al. | 348/699 |
| 6,618,441 B1 | 9/2003 | Hasegawa | |
| 6,650,787 B1 * | 11/2003 | Takahashi et al. | 382/251 |
| 6,697,567 B1 | 2/2004 | Suzuki | |
| 6,909,745 B1 | 6/2005 | Puri et al. | |
| 7,031,542 B2 | 4/2006 | Takahashi et al. | |
| 7,336,834 B2 * | 2/2008 | Ishizuka et al. | 382/232 |
| 7,342,880 B2 * | 3/2008 | Yanagihara et al. | 370/232 |
| 7,436,887 B2 * | 10/2008 | Yeredor et al. | 375/240.01 |
| 2002/0114393 A1 | 8/2002 | Vleeschouwer | |
| 2004/0062306 A1 * | 4/2004 | Takahashi et al. | 375/240.01 |
| 2004/0184666 A1 | 9/2004 | Sekiguchi et al. | |
| 2005/0063600 A1 | 3/2005 | Karaoguz et al. | |
| 2006/0029451 A1 * | 2/2006 | McLoone | 400/472 |
| 2008/0152242 A1 | 6/2008 | Karaoguz et al. | |
| 2010/0246985 A1 * | 9/2010 | Karaoguz et al. | 382/236 |

* cited by examiner

*Primary Examiner* — Amir Alavi

(74) *Attorney, Agent, or Firm* — McAndrews, Held & Malloy, Ltd.

(57) ABSTRACT

A system and method for encoding dynamic image information for an image generated by a computer application executing on a processor. Various aspects of the present invention may comprise determining a first set of information describing a reference image. A second set of information may be determined for describing an image, wherein the second set of information comprises information indicative of movement between the image and the reference image. For example, a set of primary movement directions may be determined based at least in part on the computer application generating the image. Such set of primary movement directions may be utilized for analyzing the image relative to the reference images. The difference between the image and the reference image may, for example, be analyzed using at least one of the set of primary movement directions. A movement direction may, for example, be utilized to describe the image.

26 Claims, 5 Drawing Sheets

APPLICATION BASED ADAPTIVE ENCODING

CROSS-REFERENCE TO RELATED APPLICATIONS/INCORPORATION BY REFERENCE

This patent application is a CONTINUATION of U.S. patent application Ser. No. 11/953,328, filed Dec. 10, 2007 now U.S. Pat. No. 7,724,970; which is a CONTINUATION of U.S. patent application Ser. No. 10/875,969, filed Jun. 24, 2004 now U.S. Pat. No. 7,319,795; which claims benefit from and priority to U.S. Provisional Application No. 60/505,190 filed Sep. 23, 2003. The above-identified applications are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Modern communication systems may communicate information of dynamic images. For example, modern communication systems may communicate information of moving pictures, based on a sequential set of still images.

To provide for relatively efficient communication of dynamic image information between systems over a communication medium, systems often communicate encoded dynamic image information. For example, various encoding formats may reduce the amount of information that must be transmitted to a receiving system to communicate the image to the receiving system. Many of such encoding techniques include techniques based on communicating information absolutely describing a reference image, along with information describing relative difference (or movement) between an image and the reference image. Examples of such encoding may include, for example, various MPEG-style encoding techniques.

Encoding information describing a reference image and relative difference between an image and the reference image often includes comparing the images to the reference images by spatially shifting one of the images in various directions and distances and comparing the spatially shifted image to the other image to determine if the spatial shift may be utilized to accurately describe the image relative to the reference image. Such spatial shifting and analysis may be very inefficient, depending on the image sequence being encoded.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for encoding dynamic image information for an image generated by a computer application. Various aspects of the present invention may comprise determining a first set of information describing a reference image. For example, a reference image generation module may determine such a first set of information.

A second set of information may be determined for describing an image, wherein the second set of information comprises information indicative of movement (or difference) between the image and the reference image. For example, a motion estimation module may determine such a second set of information.

A set of primary movement directions and/or distances may be determined based at least in part on the computer application generating the image. The set may also be determined, for example, based on information of user interaction with the computer application, information of a view being generated by the computer application, and/or information of image movement capability being provided to a user by the computer application. For example, a movement set determination sub-module of the motion estimation module may determine such a set of primary movement directions and/or distances.

The set of primary movement directions and/or distances may be utilized for analyzing the image relative to the reference image. For example, one of the image and reference image may be displaced by one or more of the primary movement directions and/or distances (or a combination thereof), and then compared to the non-displaced image for a determination of accuracy. Such image analysis may, for example, comprise utilizing some or all of the set of primary movement directions and/or distances. Such image analysis may, for example comprise utilizing a direction and/or distance not in the set of primary directions and/or distances. For example, a motion estimation sub-module of the motion estimation module may perform such analysis.

A movement direction and/or distance may, for example, be utilized to describe the image relative to the reference image. For example and without limitation, the image may be described relative to the reference image by describing the image relative to the reference image. For example, the image may be described by a movement direction and/or movement distance relative to the reference image. For example, the motion estimation module or sub-module may generate such an image description.

These and other advantages, aspects and novel features of the present invention, as well as details of illustrative aspects thereof, will be more fully understood from the following description and drawings.

DETAILED DESCRIPTION OF THE INVENTION

Figure 1:
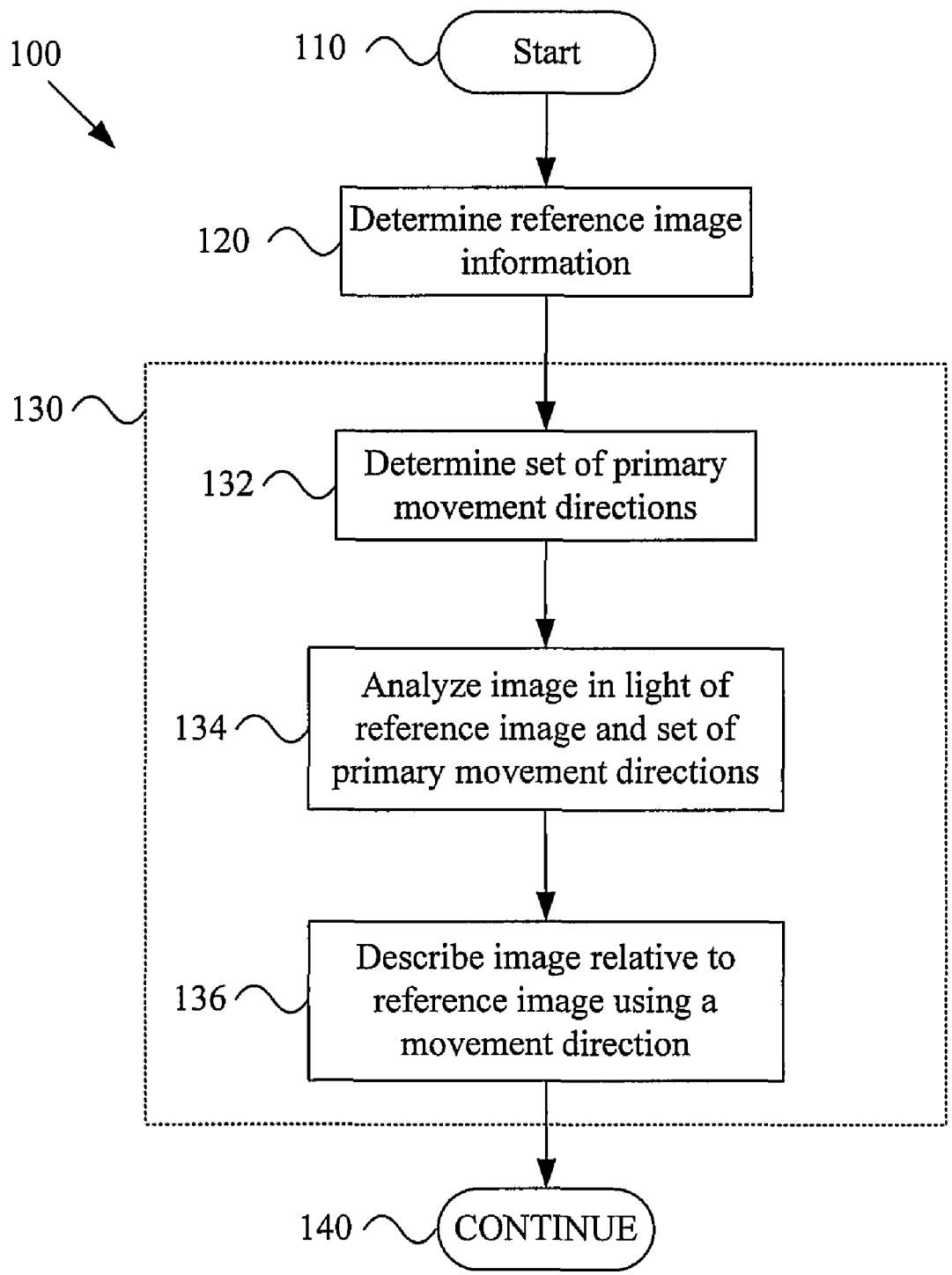
FIG. 1 is a flow diagram illustrating a method for application based adaptive encoding of dynamic image information, in accordance with various aspects of the present invention.

FIG. 1 is a flow diagram illustrating a method 100 for application based adaptive encoding of dynamic image information, in accordance with various aspects of the present invention. The method 100 begins at step 110. Various events and conditions may cause the method 100 to begin. For example, a user may request that a first system provide image information to a second system, or the first system may automatically decide to provide such information. Generally, the method 100 may be initiated for a variety of reasons. Accordingly, the scope of various aspects of the present invention should not be limited by characteristics of particular initiating events or conditions.

The method, at step 120, comprises determining a first set of information describing a reference image. Such a first set of information may, for example, serve as a basis of comparison for one or more subsequent images. For example and without limitation, an MPEG I-frame or portion thereof may be one of many examples of such a first set of information. The first set of information may be determined based on any of a variety of techniques for describing an image. Accordingly, the scope of various aspects of the present invention should not be limited by characteristics of a particular method for determining a set of information describing an image.

The method, at step 130, comprises determining a second set of information describing an image. The second set of information may comprise, for example, information indicative of movement between the image and the reference image discussed with regard to step 120. For example and without limitation, an MPEG P-frame (or B-frame) or portion thereof may be one of many examples of such a second set of information. In the following discussion, the term "movement" is often used interchangeably with the terms "displacement" and "difference." For example, a difference between two sequential images may be perceived or characterized as movement. Accordingly, the scope of various aspects of the present invention should not be limited by utilization of the terms "movement," "displacement" or "difference" in a particular context.

Step 130 may, for example, comprise various sub-steps, some of which are illustrated as steps 132, 134 and 136 in FIG. 1, and discussed below. It should be noted that the sub-steps 132, 134 and 136 illustrated in FIG. 1 are exemplary. Accordingly, step 130 may comprise each, none, or a portion of the exemplary sub-steps 132, 134 and 136. Further, step 130 may comprise additional sub-steps not illustrated in FIG. 1.

The method 100, at step 132, may comprise determining, based at least in part on the computer application (e.g., a computer software application) generating the image, a set of primary movement directions for describing the image relative to the reference image. The set of primary movement directions may generally be utilized in encoding the image. The set of primary movement directions may, for example, be an exclusive set of all movement directions that will be utilized for subsequent image encoding. Alternatively, for example, the set of primary movement directions may be a preferred set of movement directions that should be analyzed for encoding an image prior to analyzing the image with movement directions that are not in the set. Also, for example, the set of primary movement directions may comprise an ordered list of primary movement directions that should be analyzed in sequential order for encoding an image.

The set of primary movement directions may, for example, include only one movement direction. Also, for example, the set of primary movement directions may include two, four, eight, ten, sixteen, or any number of movement directions. In general, the set of primary movement directions may comprise a subset of all possible two or three dimensional movement directions. Accordingly, the scope of various aspects of the present invention should not be limited by characteristics of a particular movement direction or set of movement directions.

Step 132 may, for example, comprise acquiring information of the computer application that is generating the image to be encoded. Step 132 may, for example, comprise analyzing such information to determine which computer application is generating the image. Step 132 may determine the set of primary movement directions based, at least in part, on which computer application is generating the image.

For example, if a word processing application is generating the image, step 132 may comprise determining that the set of primary movement directions comprises only up and down movement directions. Alternatively, for example, if a word processing application is generating the image, step 132 may comprise determining that the set of primary movement directions comprises only up, down, left and right directions. Also, for example, if a spreadsheet application is generating the image, step 132 may comprise determining that the set of primary movement directions comprises only up, down, left and right directions. Additionally, for example, if a two-dimensional drawing application is generating the image, step 132 may comprise determining that the set of primary movement directions comprises a subset of all possible 2-dimensional movement directions. Also, for example, if a relatively low-quality gaming application is generating the image, step 132 may comprise determining that the set of primary movement directions comprises a set of sixteen movement directions in the general plane of a two-dimensional view.

Step 132 may, for example, comprise determining the set of primary movement directions in any of a large variety of ways. For example and without limitation, step 132 may comprise utilizing a table that assigns a particular set of primary movement directions to a particular computer application or particular type of computer application. Step 132 may, for example, comprise determining the set of primary movement directions by performing an algorithm or solving an equation.

Step 132 may, for example, comprise determining the set of primary movement directions based, at least in part, on how a user of the computer application is currently interacting with the computer application.

For example, a user may currently be scrolling down through a document. In such an exemplary scenario, step 132 may place the downward movement direction at the highest priority in an ordered set of primary movement directions. Also, for example, a user may currently be typing in a word processing document or entering rows of values in a computer spreadsheet. In such an exemplary scenario, step 132 may place an upward movement direction at the highest priority in an ordered set of primary movement directions. Additionally, for example, a user may currently be causing an image in a drawing package to move in a particular direction. In such an exemplary scenario, step 132 may place one or more movement directions that generally represent the history or trend of the image movement at the highest priority in an ordered set of primary movement directions.

In general, step 132 may comprise determining the set of primary movement directions based, at least in part, on how a user of the computer application is currently interacting with the computer application. Accordingly, the scope of various aspects of the present invention should not be limited by characteristics of particular user interactions or methods of utilizing information of such user interactions to determine aspects of the set of primary movement directions.

Step 132 may, for example, comprise determining the set of primary movement directions, based at least in part, on characteristics of a current image view that the computer application is generating. For example and without limitation, a computer application may be generating a view that represents the entire width of a document. In such an exemplary scenario, step 132 may comprise assigning up and down movement directions to the set of primary movement directions, and removing left and right movement directions from the set of primary movement directions. Alternatively, in such an exemplary scenario, step 132 may comprise changing order in an ordered set of primary movement directions by, for example, assigning up and down movement directions to higher priority positions in the ordered set.

Generally, the view that the computer application is generating may influence the probability that the image will move in various directions. In general, step 132 may comprise utilizing information of such a current view to determine, for example, membership or order aspects of a set of primary movement directions. Accordingly, the scope of various aspects of the present invention should not be limited by characteristics of a particular view or method for considering view information in determining the set of primary movement directions.

Step 132 may, for example, comprise determining the set of primary movement directions based, at least in part, on image movement capability that the computer application is providing to the user. For example and without limitation, the computer application may be providing a user the ability to scroll an image left and right, but not up and down. In such an exemplary scenario, step 132 may, for example, comprise determining that the set of primary movement directions comprises left and right movement directions, but not up and down movement directions. Alternatively, for example, when a user is viewing the top of a graphical presentation image, the computer application may only provide for downward and left/right scrolling of the image. In such as exemplary scenario, step 132 may, for example, comprise determining that the set of primary movement directions comprises down, left and right movement directions.

In general, step 132 may comprise determining the set of primary movement directions based, at least in part, on image movement capability that the computer application is providing to the user. Accordingly, the scope of various aspects of the present invention should not be limited to particular image movement capabilities or methods for utilizing knowledge of such image movement capabilities for determining aspects of a set of primary movement directions.

The previous discussion mentioned various exemplary factors that step 132 may consider in determining the set of primary movement directions. The previous examples are by no means an exclusive list. In general, step 132 may comprise determining the set of primary movement directions based, at least in part, on information of the computer application generating the image to be encoded. Accordingly, the scope of various aspects of the present invention should not be limited by characteristics of a particular computer application, a particular set of movement directions, or a particular method for determining the set of primary movement directions.

The method 100, at step 134, may comprise analyzing the difference (or movement) between the image and the reference image using at least one of the set of primary movement directions established at step 132. For example and without limitation, step 134 may comprise moving the image or reference image various distances in one of the set of primary movement directions and determining a correlation at various points between the moved image and the unmoved image. Such a correlation may, for example, be considered in determining whether to utilize the movement direction for describing the image in relation to the reference image.

Step 134 may, for example, comprise utilizing each of the set of primary movement directions to analyze the image relative to the reference image. For example, step 134 may utilize each of the set of primary movement directions to analyze the image relative to the reference image and then determine a best fit (e.g., the movement direction resulting in the highest correlation). Also, for example, step 134 may comprise sequentially utilizing the movement directions in the set of primary movement directions until step 134 determines that an appropriate movement direction for describing the image relative to the reference image has been found (e.g., a correlation threshold is exceeded).

As mentioned previously, the set of primary movement directions may be an exclusive list of movement directions or a non-exclusive list of movement directions. For example step 134 may be limited to only utilizing the movement directions in the set of primary movement directions to analyze the image relative to the reference image. Alternatively, for example, step 134 may comprise analyzing the image relative to the reference image in light of the set of primary movement directions, unless the set of primary movement directions proves to be inadequate, in which case step 134 may utilize movement directions not in the set of primary movement directions.

In general, step 134 may comprise analyzing the image relative to the reference image in light of the set of primary movement directions. Accordingly, the scope of various aspects of the present invention should not be limited by characteristics of the previous exemplary illustrations. For example, the scope of various aspects of the present invention should not be limited by whether the set of primary movement directions represents an exclusive or non-exclusive list of movement directions, or by whether the set of primary movement directions is a prioritized list. Also for example, the scope of various aspects of the present invention should not be limited by whether step 134 comprises analyzing the image relative to the reference image in light of a portion or all of the movement directions in the set of primary movement directions, or by whether step 134 utilizes a best fit, threshold, or other metric to determine a movement direction to utilize for describing the image relative to the reference image.

The method 100, at step 136, may comprise utilizing a movement direction to describe the image relative to the reference image. As discussed previously, step 134 may comprise analyzing the image relative to the reference image in light of the set of primary movement directions. Also as discussed previously, step 134 may comprise determining a movement direction that is appropriate (or the most appropriate) for describing the image relative to the reference image. Step 136 may comprise utilizing the appropriate (or most appropriate) movement direction for describing the image relative to the reference image.

Step 136 may, for example, comprise utilizing only one of the movement directions in the set of primary movement directions to describe the image relative to the reference image. Alternatively, for example, step 136 may comprise utilizing a plurality of the movement directions in the set of primary movement directions to describe the image relative to the reference image. Also, for example, step 136 may comprise utilizing a movement direction that is not in the set of primary movement directions to describe the image relative to the reference image.

The method 100, at step 140, may generally comprise performing further encoding, processing or communicating activities. For example, step 140 may comprise determining a graphical portion of the image. Such a graphical portion of the image may comprise any of a variety of graphical images. For example and without limitation, the graphical portion may comprise a window frame, icon, cursor, toolbar graphic, menu label, pushbutton, or any graphical construct. Step 140 may, for example, comprise determining movement of the graphical portion between the image and the reference image. For example, in a scenario in which a dynamic image comprising a moving cursor is being encoded, step 140 may comprise determining movement of the cursor graphic in the image relative to the reference image. Such graphical and graphical movement information may, for example, be incorporated into the second set of information or may alternatively, for example, be incorporated in a separate set of information.

Figure 2:
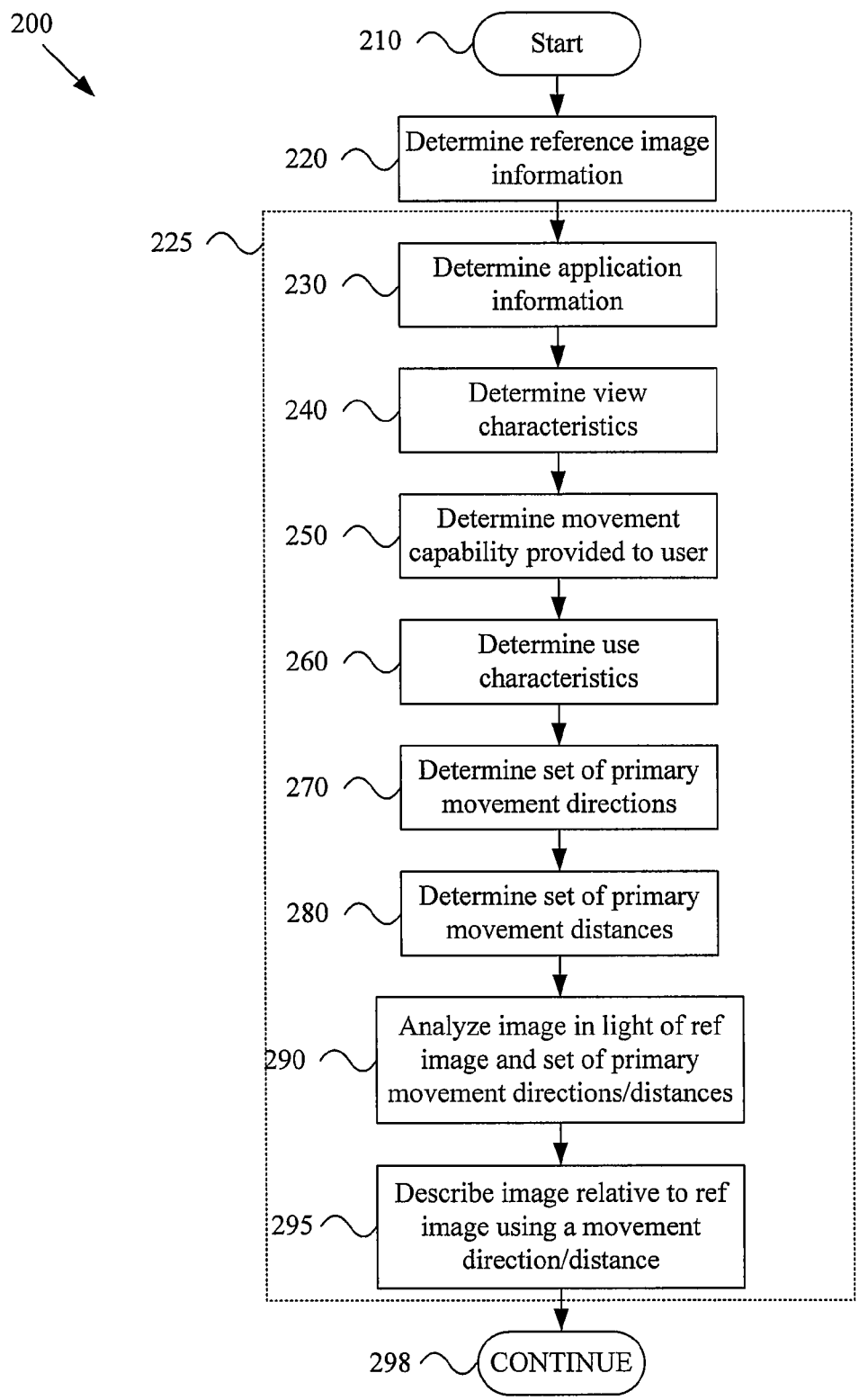
FIG. 2 is a flow diagram illustrating a method for application based adaptive encoding of dynamic image information, in accordance with various aspects of the present invention.

FIG. 2 is a flow diagram illustrating a method 200 for application based adaptive encoding of dynamic image information, in accordance with various aspects of the present invention. The following discussion of the method 200 will include various aspects that were discussed previously with regard to the method 100 illustrated in FIG. 1, and will also include various aspects that were not discussed previously. The methods 100, 200 illustrated in FIGS. 1 and 2 are exemplary illustrations of methods including a portion of various aspects of the present invention. Accordingly, by no means should the scope of various aspects of the present invention be limited by characteristics of the exemplary methods 100, 200 as shown and discussed.

The method begins at step 210. Various events and conditions may cause the method 200 to begin. For example, a user may request that a first system provide image information to a second system, or the first system may automatically decide to provide such information. Generally, the method 200 may be initiated for a variety of reasons and by a variety of conditions. Accordingly, the scope of various aspects of the present invention should not be limited by characteristics of particular initiating events or conditions.

The method, at step 220, comprises determining a first set of information describing a reference image. Such a first set of information may, for example, serve as a basis of comparison for one or more subsequent images. For example and without limitation, an MPEG I-frame or portion thereof may be one of many examples of such a first set of information. The first set of information may be determined based on any of a variety of techniques for describing an image. Accordingly, the scope of various aspects of the present invention should not be limited by characteristics of a particular method for determining a set of information describing an image.

The method, at step 225, comprises determining a second set of information describing an image. The second set of information may comprise, for example, information indicative of movement between the image and the reference image discussed with regard to step 220. For example and without limitation, an MPEG P-frame (or B-frame) or portion thereof may be one of many examples of such a second set of information.

Step 225 may, for example, share various aspects with step 130 discussed previously with regard to the method 100 shown in FIG. 1. Step 225 may, for example, comprise various sub-steps, some of which are illustrated as steps 230-295 in FIG. 2 and discussed below. It should be noted that the sub-steps 230-295 illustrated in FIG. 2 are exemplary. Accordingly, step 225 may comprise each, none, or a portion of the exemplary sub-steps 230-295. Further, step 225 may comprise additional sub-steps not illustrated in FIG. 2.

The method 200, at step 230, may comprise determining application information regarding the computer application that is generating the image. Step 230 may, for example, comprise acquiring application information from the computer application or the computer operating system. Such information may, for example, be utilized in subsequent steps (e.g., steps 270 and 280) to determine one or more sets of primary movement information. Such application information may comprise, for example, computer application name, computer application type (e.g., word processor, spreadsheet application, drawing application, slide presentation package, video game), and computer application image processing capabilities. In general, the application information may comprise any of a large variety of information regarding the computer application, particularly such information that may be of use in making image-encoding decisions.

The method 200, at step 240, may comprise determining characteristics of an image view that the computer application is generating. Step 240 may, for example, comprise acquiring image view information from the computer application or computer operating system. Such information may, for example, be utilized in subsequent steps (e.g., steps 270 and 280) to determine one or more sets of primary movement information. Such image view characteristics may, for example, comprise view width and height information. For example, image view characteristics may comprise information of whether the computer application is currently generating a view of an entire width or height of a document, drawing, presentation, etc. In general, the image view information may comprise any of a large variety of characteristics of a view, particularly such information that may be of use in making image-encoding decisions.

The method 200, at step 250, may comprise determining image movement capability that the computer application is providing. Step 250 may, for example, comprise acquiring application information from the computer application or the computer operating system. Such information may, for example, be utilized in subsequent steps (e.g., steps 270 and 280) to determine one or more sets of primary movement information. Such image movement capability may, for example, comprise view scrolling characteristics, linefeed characteristics, row and column height, font characteristics, view zooming characteristics, etc. In general, the image movement capability may comprise any of a large variety of image movement characteristics, particularly such information that may be of use in making image-encoding decisions.

The method 200, at step 260, may comprise determining how a user is currently interacting with the computer application in viewing the image. Step 260 may, for example, comprise acquiring application information from the computer application or the computer operating system. Such information may, for example, be utilized in subsequent steps (e.g., steps 270 and 280) to determine one or more sets of primary movement information. User interaction characteristics may, for example, comprise whether a user is currently scrolling or in what direction a user is currently scrolling. User interaction characteristics may, for example, comprise whether the user is typing text or populating fields in a spreadsheet (e.g., by row or by column), whether the user is using keyboard arrow keys, etc. In general, the image movement capability may comprise any of a large variety of user interaction characteristics, particularly such information that may be of use in making image-encoding decisions.

The method 200, at step 270, may comprise determining, based at least in part on the computer application generating the image, a set of primary movement directions for describing the image relative to the reference image. The set of primary movement directions may generally be utilized in encoding the image. The set of primary movement directions may, for example, be an exclusive set of all movement directions that will be utilized for subsequent image encoding. Alternatively, for example, the set of primary movement directions may be a preferred set of movement directions that should be analyzed for encoding an image prior to analyzing the image with movement directions that are not in the set. Also, for example, the set of primary movement directions may comprise an ordered list of primary movement directions that should be analyzed in sequential order for encoding an image.

The set of primary movement directions may, for example, include only one movement direction. Also, for example, the set of primary movement directions may include two, four, eight, ten, sixteen, or any number of movement directions. In general, the set of primary movement directions may comprise a subset of all possible two or three dimensional movement directions. Accordingly, the scope of various aspects of the present invention should not be limited by characteristics of a particular movement direction or set of movement directions.

Step 270 may, for example, comprise analyzing computer application information determined at step 230. Step 270 may determine the set of primary movement directions based, at least in part, on which computer application is generating the image.

For example, if a word processing application is generating the image, step 270 may comprise determining that the set of primary movement directions comprises only up and down movement directions. Alternatively, for example, if a word processing application is generating the image, step 270 may comprise determining that the set of primary movement directions comprises only up, down, left and right directions. Also, for example, if a spreadsheet application is generating the image, step 270 may comprise determining that the set of primary movement directions comprises only up, down, left and right directions. Additionally, for example, if a two-dimensional drawing application is generating the image, step 270 may comprise determining that the set of primary movement directions comprises a subset of all possible 2-dimensional movement directions. Also, for example, if a relatively low-quality gaming application is generating the image, step 270 may comprise determining that the set of primary movement directions comprises a set of sixteen movement directions in the general plane of a two-dimensional image view.

Step 270 may, for example, comprise determining the set of primary movement directions in any of a large variety of ways. For example and without limitation, step 270 may comprise utilizing a table that assigns a particular set of primary movement directions to a particular computer application or particular type of computer application. Step 270 may, for example, comprise determining the set of primary movement directions by executing an algorithm or solving an equation.

Step 270 may, for example, comprise analyzing user interaction information determined at step 260. Step 270 may, for example, comprise determining the set of primary movement directions based, at least in part, on how a user of the computer application is currently interacting with the computer application.

For example, a user may currently be scrolling down through a document. In such an exemplary scenario, step 270 may comprise placing the downward movement direction at the highest priority in an ordered set of primary movement directions. Also, for example, a user may currently be typing in a word processing document or entering rows of values in a computer spreadsheet. In such an exemplary scenario, step 270 may comprise placing an upward movement direction at the highest priority in an ordered set of primary movement directions. Additionally, for example, a user may currently be causing an image in a drawing package to move in a particular direction. In such an exemplary scenario, step 270 may comprise placing one or more movement directions that generally represent the history or trend of the image movement at the highest priority in an ordered set of primary movement directions.

In general, step 270 may comprise determining the set of primary movement directions based, at least in part, on how a user of the computer application is currently interacting with the computer application. Accordingly, the scope of various aspects of the present invention should not be limited by characteristics of particular user interactions or methods of utilizing information of such user interactions to determine aspects of the set of primary movement directions.

Step 270 may, for example, comprise analyzing view characteristic information determined at step 240. Step 270 may, for example, comprise determining the set of primary movement directions based, at least in part, on characteristics of a current image view that the computer application is generating.

For example and without limitation, a computer application may be generating a view that represents the entire width of a document. In such an exemplary scenario, step 270 may comprise assigning up and down movement directions to the set of primary movement directions, and removing left and right movement directions from the set of primary movement directions. Alternatively, in such an exemplary scenario, step 270 may comprise changing order in an ordered set of primary movement directions by, for example, assigning up and down movement directions to higher priority positions in the ordered set.

Generally, the view that the computer application is generating may influence the probability that the image will move in various directions. In general, step 270 may comprise utilizing information of such a current view to determine, for example, membership or order aspects of a set of primary movement directions. Accordingly, the scope of various aspects of the present invention should not be limited by characteristics of a particular view or method for considering view information in determining the set of primary movement directions.

Step 270 may, for example, comprise analyzing image movement capability determined at step 250. Step 270 may, for example, comprise determining the set of primary movement directions based, at least in part, on image movement capability that the computer application is providing to the user.

For example and without limitation, the computer application may be providing a user the ability to scroll an image left and right, but not up and down. In such an exemplary scenario, step 270 may, for example, comprise determining that the set of primary movement directions comprises left and right movement directions, but not up and down movement directions. Alternatively, for example, when a user is viewing the top of a graphical presentation image, the computer application may only provide for downward and left/right scrolling of the image. In such as exemplary scenario, step 270 may, for example, comprise determining that the set of primary movement directions comprises down, left and right movement directions.

In general, step 270 may comprise determining the set of primary movement directions based, at least in part, on image movement capability that the computer application is providing to the user. Accordingly, the scope of various aspects of the present invention should not be limited to particular image movement capabilities or methods for utilizing knowledge of such image movement capabilities for determining aspects of a set of primary movement directions.

The previous discussion mentioned various exemplary factors that step 270 may consider in determining the set of primary movement directions. The previous examples are by no means an exclusive list. In general, step 270 may comprise determining the set of primary movement directions based, at least in part, on information of the computer application generating the image to be encoded. Accordingly, the scope of various aspects of the present invention should not be limited by characteristics of a particular computer application, a particular set of movement directions, or a particular method for determining the set of primary movement directions.

The method 200, at step 280, may comprise determining, based at least in part on the computer application generating the image, a set of primary movement distances for describing the image relative to the reference image. The set of primary movement distances may, for example, correspond to respective movement directions in the set of primary movement directions determined at step 270. The set of primary movement distances may generally be utilized in encoding the image. The set of primary movement distances may, for example, be an exclusive set of all movement distances that will be utilized for subsequent image encoding. Alternatively, for example, the set of primary movement distances may be a preferred set of movement distances that should be analyzed for encoding an image prior to analyzing the image with movement distances that are not in the set. Also, for example, the set of primary movement distances may comprise an ordered list of primary movement distances that should be analyzed in sequential order for encoding an image.

The set of primary movement distances may, for example, comprise only one movement distance. Also, for example, the set of primary movement distances may include one, two, three, four, or any number of movement distances. In general, the set of primary movement distances may comprise a subset of all possible movement distances. Accordingly, the scope of various aspects of the present invention should not be limited by characteristics of a particular movement distances or set of movement distances.

Step 280 may, for example, comprise analyzing computer application information determined at step 230. Step 280 may comprise determining the set of primary movement distances based, at least in part, on which computer application is generating the image.

For example, if a word processing application is generating the image, step 280 may comprise determining that the set of primary movement distances comprises a typical linefeed or scroll step distance. Alternatively, for example, if a word processing application is generating the image, step 280 may comprise determining that the set of primary movement distances comprises linefeed, scroll step, tab, standard indentation and various character space distances. Also, for example, if a spreadsheet application is generating the image, step 280 may comprise determining that the set of primary movement distances comprises row height, column width and scroll step distances. Additionally, for example, if a two-dimensional drawing application is generating the image, step 280 may comprise determining that the set of primary movement distances comprises a subset of all of the possible 2-dimensional movement directions, where the subset includes distances statistically determined to be common for such application. Also, for example, if a relatively low-quality gaming application is generating the image, step 280 may comprise determining that the set of primary movement distances comprises a set of the 10 most common movement distances.

Step 280 may, for example, comprise determining the set of primary movement distances in any of a large variety of ways. For example and without limitation, step 280 may comprise utilizing a table that assigns a particular set of primary movement distances to a particular computer application or particular type of computer application. Step 280 may, for example, comprise determining the set of primary movement distances by executing an algorithm or solving an equation.

Step 280 may, for example, comprise analyzing user interaction information determined at step 260. Step 280 may, for example, comprise determining the set of primary movement distances based, at least in part, on how a user of the computer application is currently interacting with the computer application.

For example, a user may currently be scrolling down through a document in fixed increments. In such an exemplary scenario, step 280 may comprise placing the fixed scroll increment at the highest priority in an ordered set of primary movement distances. Also, for example, a user may currently be typing in a word processing document or entering rows of values in a computer spreadsheet. In such an exemplary scenario, step 280 may comprise placing a typical linefeed, row height or column width at the highest priority in an ordered set of primary movement distances. Additionally, for example, a user may currently be shifting an image in a drawing package by a regular distance. In such an exemplary scenario, step 280 may comprise placing one or more movement distances that generally represent the history or trend of the image movement at the highest priority in an ordered set of primary movement distances.

In general, step 280 may comprise determining the set of primary movement distances based, at least in part, on how a user of the computer application is currently interacting with the computer application. Accordingly, the scope of various aspects of the present invention should not be limited by characteristics of particular user interactions or methods of utilizing information of such user interactions to determine aspects of the set of primary movement distances.

Step 280 may, for example, comprise analyzing view characteristic information determined at step 240. Step 280 may, for example, comprise determining the set of primary movement distances based, at least in part, on characteristics of a current image view that the computer application is generating.

For example and without limitation, a computer application may be generating a view that represents the entire width of a document. In such an exemplary scenario, step 280 may comprise assigning typical up and down scroll increments to the set of primary movement distances, and removing left and right scroll increments from the set of primary movement distances. Also, in such an exemplary scenario, step 280 may comprise modifying various common step sizes in the set of primary distances (e.g., linefeed step size and scroll step size). Alternatively, in such an exemplary scenario, step 280 may comprise changing the order in an ordered set of primary movement distances by, for example, assigning scroll step distances to higher priority positions in the ordered set.

Generally, the view that the computer application is generating may influence the probability that the image will move various distances. In general, step 280 may comprise utilizing information of such a current view to determine, for example, membership or order aspects of a set of primary movement distances. Accordingly, the scope of various aspects of the present invention should not be limited by characteristics of a particular view or method for considering view information in determining the set of primary movement distances.

Step 280 may, for example, comprise analyzing image movement capability determined at step 250. Step 280 may, for example, comprise determining the set of primary movement distances based, at least in part, on image movement capability that the computer application is providing to the user.

For example and without limitation, the computer application may be providing a user the ability to scroll an image left and right, but not up and down. In such an exemplary scenario, step 280 may, for example, comprise determining that the set of primary movement distances comprises typical left-right scroll step distances, but not up and down scroll step distances. Alternatively, for example, when a word processing computer application is not providing a user the ability to scroll an image, step 270 may, for example, comprise determining that the set of primary movement distances comprises a linefeed distance in a high priority position in the set.

In general, step 280 may comprise determining the set of primary movement distances based, at least in part, on image movement capability that the computer application is providing to the user. Accordingly, the scope of various aspects of the present invention should not be limited to particular image movement capabilities or methods for utilizing knowledge of such image movement capabilities for determining aspects of a set of primary movement distances.

The previous discussion mentioned various exemplary factors that step 280 may consider in determining the set of primary movement distances. The previous examples are by no means an exclusive list. In general, step 280 may comprise determining the set of primary movement distances based, at least in part, on information of the computer application generating the image to be encoded. Accordingly, the scope of various aspects of the present invention should not be limited by characteristics of a particular computer application, a particular set of movement distances, or a particular method for determining the set of primary movement distances The method 200, at step 290, may comprise analyzing the difference (or movement) between the image and the reference image in light of at least one of the set of primary movement directions (developed at step 270) and/or in light of at least one of the set of primary movement distances (developed at step 280). For example and without limitation, step 290 may comprise moving the image or reference image one of the set of primary movement distances in one of the set of primary movement directions and determining a correlation at various points between the moved image and the unmoved image. Such a correlation may, for example, be considered in determining whether to utilize the movement distance and/or direction for describing the image in relation to the reference image.

Step 290 may, for example, comprise utilizing some or all of the set of primary movement directions and/or some or all of the set of primary movement distances to analyze the image relative to the reference image. For example, step 290 may utilize a subset of the set of primary movement directions and a subset of each of the set of primary movement distances to analyze the image relative to the reference image and then determine a best fit (e.g., the movement distance direction resulting in the highest correlation between the image and the reference image). Also, for example, step 290 may comprise sequentially utilizing the movement directions in the set or primary directions and/or the movement distances in the set of primary movement distances until step 290 determines that an appropriate movement direction and distance for describing the image relative to the reference image has been found (e.g., a correlation threshold is exceeded).

As mentioned previously, the sets of primary movement directions and/or distances may be exclusive lists of movement directions and/or distances or non-exclusive lists of movement directions and/or distances. For example, step 290 may be limited to only utilizing the movement directions and distances in the sets of primary movement directions and distances to analyze the image relative to the reference image. Alternatively, for example, step 290 may comprise analyzing the image relative to the reference image in light of the set of primary movement directions and/or distances, unless the set of primary movement directions and/or distances proves to be inadequate, in which case step 134 may utilize movement directions and/or distances not in the set of primary movement directions and/or distances.

In general, step 290 may comprise analyzing the image relative to the reference image in light of the sets of primary movement directions and/or distances. Accordingly, the scope of various aspects of the present invention should not be limited by characteristics of the previous exemplary illustrations. For example, the scope of various aspects of the present invention should not be limited by whether the sets of primary movement directions and/or distances represent an exclusive or non-exclusive set of movement options, or by whether the sets of primary movement directions and/or distances are prioritized lists. Also for example, the scope of various aspects of the present invention should not be limited by whether step 290 comprises analyzing the image relative to the reference image in light of a portion or all of the movement directions and/or distances in the sets of primary movement directions and distances, or by whether step 290 utilizes a best fit, threshold, or other metric to determine a movement direction and/or distance to utilize for describing the image relative to the reference image.

The method 200, at step 295, may comprise utilizing a movement direction and/or distance to describe the image relative to the reference image. As discussed previously, step 290 may comprise analyzing the image relative to the reference image in light of the set of primary movement directions and/or primary movement distances. Also as discussed previously, step 290 may comprise determining a movement direction and/or distance that is appropriate (or the most appropriate) for describing the image relative to the reference image. Step 295 may comprise utilizing the appropriate (or most appropriate) movement direction and/or distance for describing the image relative to the reference image.

Step 295 may, for example, comprise utilizing only one or a plurality of the movement directions in the set of primary movement directions to describe the image relative to the reference image. Similarly, for example, step 295 may comprise utilizing only one or a plurality of the movement distances in the set of primary movement distances to describe the image relative to the reference image. Also, for example, step 295 may comprise utilizing a movement direction and/or distance that are not in the sets of primary movement directions and distances to describe the image relative to the reference image.

The method 200, at step 298, may generally comprise performing further encoding, processing or communicating activities. For example, step 298 may comprise determining a graphical portion of the image. Such a graphical portion of the image may comprise any of a variety of graphical images. For example and without limitation, the graphical portion may comprise a window frame, icon, cursor, toolbar graphic, menu label, pushbutton, or any graphical construct. Step 298 may, for example, comprise determining movement of the graphical portion between the image and the reference image. For example, in a scenario in which a dynamic image comprising a moving cursor is being encoded, step 298 may comprise determining movement of the cursor graphic in the image relative to the reference image. Such graphical and graphical movement information may, for example, be incorporated into the second set of information or may alternatively, for example, be incorporated in a separate set of information.

Figure 3:
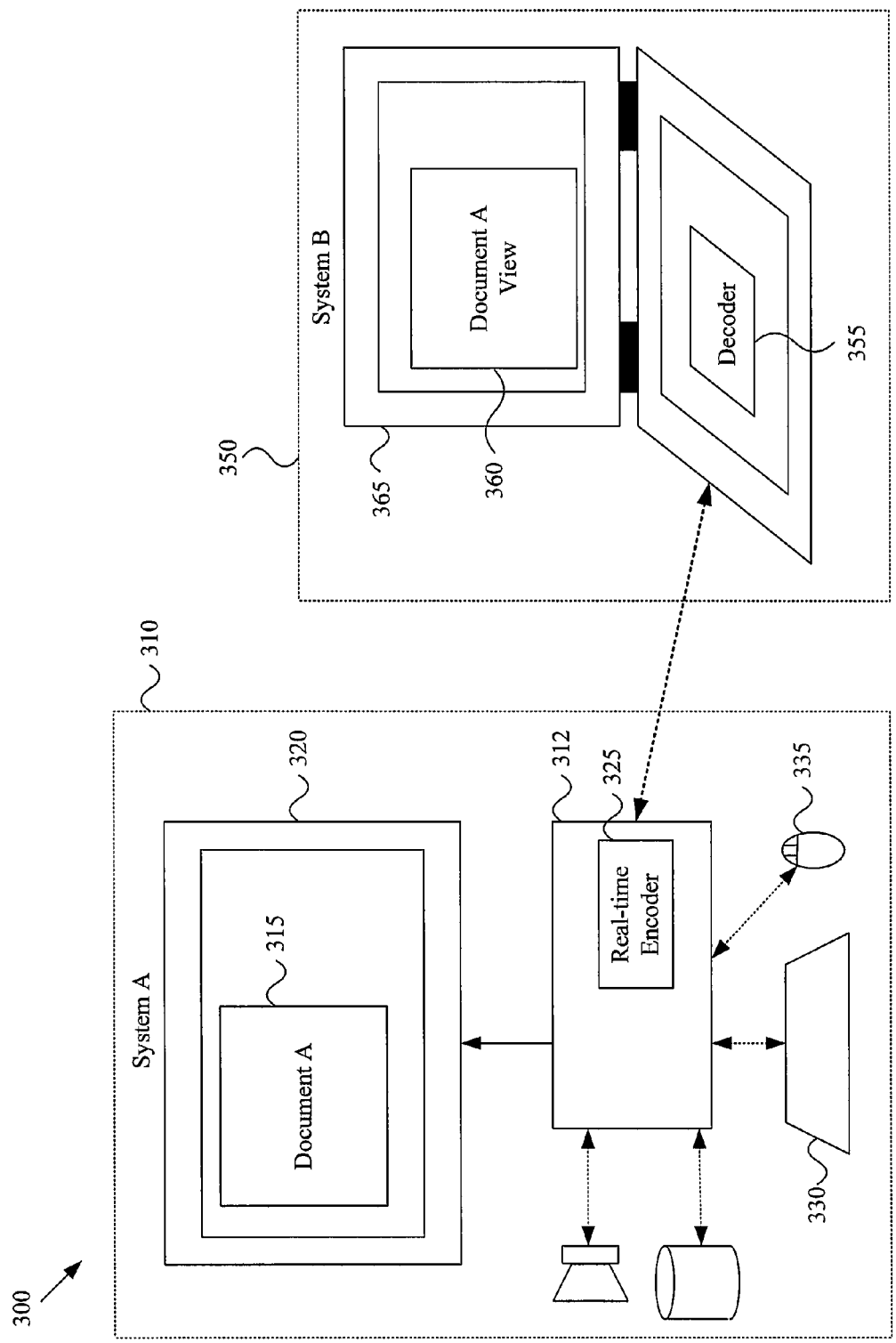
FIG. 3 is a diagram showing a system incorporating application based adaptive encoding, in accordance with various aspects of the present invention.

FIG. 3 is a diagram showing a system 300 incorporating application based adaptive encoding, in accordance with various aspects of the present invention. The exemplary system 300 may comprise a first system 310 (System A) and a second system 350 (System B). In the exemplary system 300, the first system 310 may comprise a desktop computing station, and the second system 350 may comprise a laptop or notebook computing system. Note, however, that the scope of various aspects of the present invention should by no means be limited by characteristics of the exemplary system configuration 300 shown in FIG. 3.

The first exemplary system 310 may comprise a processing unit 312. The processing unit 312 may, for example, execute a computer application to generate an image or set of images 315 for presentation on a display 320. The previous discussion and the following discussion generally discuss encoding a dynamic image. It should be noted that the scope of various aspects of the present invention should not be limited to the characteristics of the image. For example, the scope of various aspects of the present invention should not be limited by the dimensions of an image, or whether an image is one image in a set of images, or whether an image is only a portion of a larger image. Accordingly, though the following discussion may refer to the image or set of images 315 as an image 315, this should not be construed as limiting the term "image" in any way.

A user of the first system 310 may, for example, utilize a keyboard 330 and mouse 335 to interact with the processing unit 312 and the computer application executing thereon. The computer application may autonomously, or in conjunction with user interaction with the processing unit 312, cause the image 315 to move or change within its viewing window on the display 320. Accordingly, the image 315 may exhibit various dynamic image characteristics.

The processing unit 312 may comprise an encoder, for example a real-time encoder 325, to encode information of the dynamic image 315 for communication to another entity (e.g., over a wireless communication network). For example, the real-time encoder 325 may encode information of the dynamic image 315 for transmission to the second system 350.

As mentioned previously, the second system 350 may comprise a laptop or notebook computing system. The second system 350 may, for example, comprise a decoder 355 for decoding encoded information of the dynamic image 315 communicated to the second system 350 by the first system 310. The second system 350 may, for example, utilize the decoded information of the dynamic image 315 to present a view of the dynamic image 360 on a display 365 of the second system 350.

Figure 4:
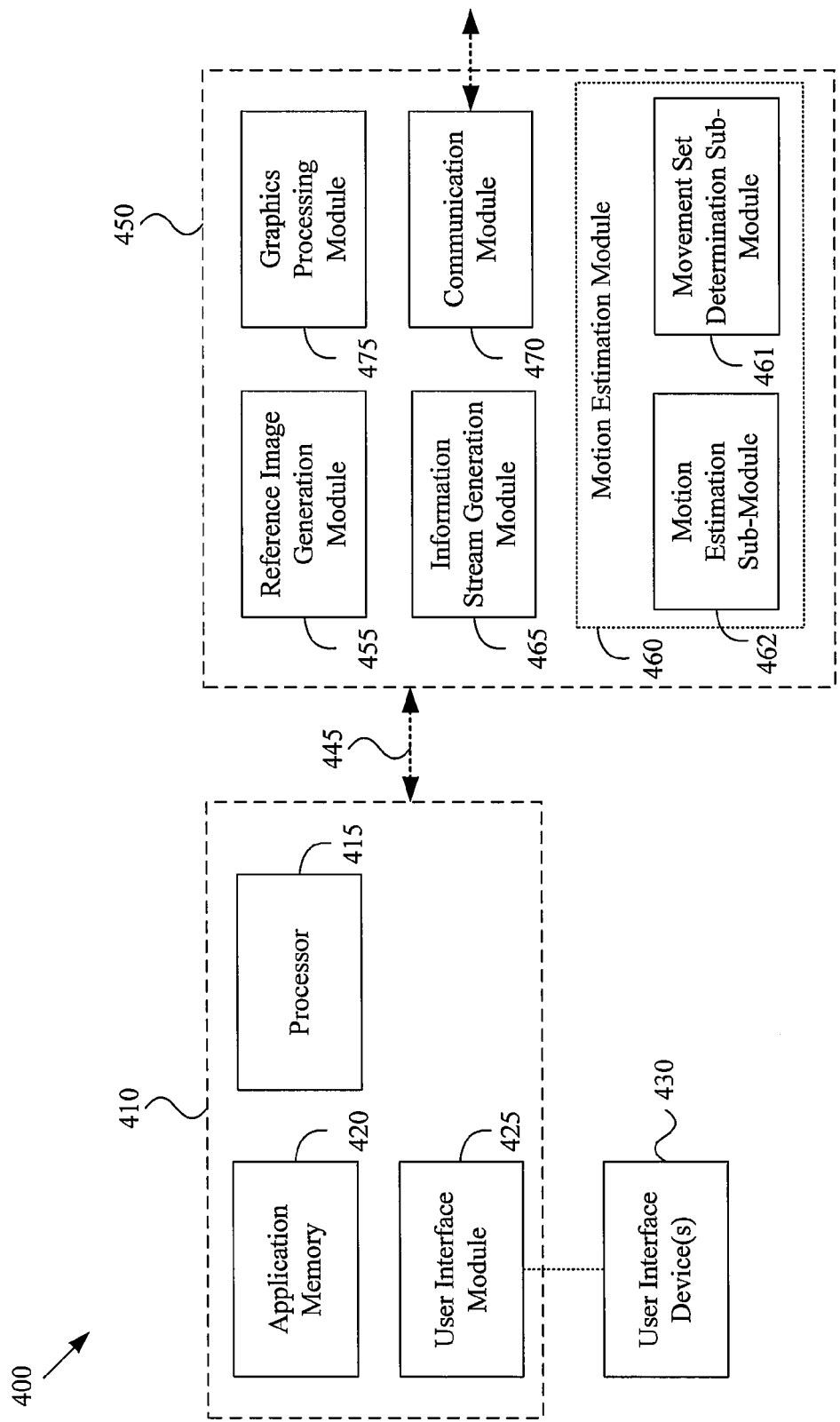
FIG. 4 is a diagram showing a system for performing application based adaptive encoding, in accordance with various aspects of the present invention.

FIG. 4 is a diagram showing a system 400 for performing application based adaptive encoding, in accordance with various aspects of the present invention. Various components of the system 400 may, for example, perform operations as discussed previously with regard to FIGS. 1-3. Accordingly, the following discussion will often, for example, refer to aspects of the methods 100, 200 illustrated in FIGS. 1-2 and discussed previously. However, it is to be stressed at this point that the scope of various aspects of the present invention should not be limited by characteristics of the exemplary methods 100, 200.

The exemplary system 400 may comprise a first sub-system 410 and an encoder module 450. The exemplary first sub-system 410 may, for example, comprise a processor 415, an application memory 420, and a user interface module 425. The exemplary encoder module 450 may, for example, comprise a reference image generation module 455, a motion estimation module 460, an information stream generation module 465, a communication module 470 and a graphics-processing module 475. The first sub-system 410 and the encoder module 450 may be communicatively coupled through a communication link 445. Such a communication link 445 may, for example, comprise a wired, wireless, tethered optical, or non-tethered optical link. The first sub-system 410 and the encoder module 450 may, for example, be co-located or geographically dispersed.

The processor 415 of the exemplary first sub-system 410 may, for example, execute a computer application. The computer application may, for example, be stored in the application memory 420. The processor 415, executing the computer application, may generate a dynamic image. The processor 415 may utilize the user interface module 425 to present the dynamic image on a user interface device 430. Additionally, a user of the first system 410 may, for example, utilize a user interface device 430 to interface with the processor 415 executing the computer application. Such user interaction may result in modifications to the dynamic image being generated by the processor 415 executing the computer application. The first sub-system 410 may, for example, communicate information of the dynamic image to the second sub-system 450 over the communication link 445.

The exemplary encoder module 450 may comprise a reference image generation module 455. The reference image generation module 450 may, for example and without limitation, implement various aspects of reference image information determination as discussed previously with regard to steps 120 and 220 illustrated in FIGS. 1-2. Such reference image information may, for example, be utilized by other components of the encoder module 450. The reference image generation module 455 generally determines a first set of information describing a reference image.

The exemplary encoder module 450 may comprise a motion estimation module 460. The motion estimation module 460 may, for example, determine a second set of information describing an image, where the second set of information may comprise information indicative of movement (or difference) between the image and a reference image. The encoder module 450 may, for example and without limitation, implement various aspects of second set of information determination as discussed previously with regard to steps 130 and 225 illustrated in FIGS. 1-2. The second set of information may, for example, comprise information indicative of movement between the image and the reference image.

The motion estimation module 460 may, for example, comprise a movement set determination sub-module 461 and a motion estimation sub-module 462. The movement set determination sub-module 461 may, for example, determine, based at least in part on the computer application generating an image, a set of primary movement directions and/or distances for describing the image relative to a reference image. The movement set determination sub-module 461 may, for example and without limitation, implement various aspects of movement set determination as discussed previously with regard to steps 132, 270 and 280 illustrated in FIGS. 1-2. The movement set determination sub-module 461 may also, for example, implement various aspects of steps 230-260 illustrated in FIG. 2 and discussed previously.

For example, the movement set determination sub-module 461 may determine an ordered list of movement directions and/or distances based, at least in part, on the computer application generating the image. The order of such a list may, for example, be a function of the likelihood of the image being displaced a particular direction and/or distance relative to the reference image.

The movement set determination sub-module 461 may, for example, determine various aspects (e.g., composition and/or order) of the set of primary movement directions and/or distances based on information of how a user is currently interacting with the computer application generating the image. The movement set determination sub-module 461 may, for example, determine various aspects of the set of primary movement directions and/or distances based on characteristics of a current view being generated by the computer application. Also, for example, the movement set determination sub-module 461 may determine various aspects of the set of primary movement directions and/or distances based on image movement capabilities being provided to a user by the computer application. Further, for example, the movement set determination sub-module 461 may determine various aspects of the set of primary movement directions and/or distances based on any of a large variety of conditions that may affect the likelihood that an image will be displaced a particular direction and/or distance relative to a reference image.

The movement set determination sub-module 461 may, for example and without limitation, implement various aspects of the methods 100, 200 illustrated in FIGS. 1 and 2. For example, the movement set determination sub-module 461 may perform various aspects of steps 132 and 270, as discussed previously. Further, for example, the movement set determination sub-module 461 may perform various aspects of exemplary steps 230-260 illustrated in FIG. 2 and discussed previously.

The motion estimation module 460 may comprise a motion estimation sub-module 462. The motion estimation sub-module 462 may, for example, analyze an image relative to a reference image in light of the set of primary movement directions and/or distances determined by the movement set determination sub-module 461. The motion estimation sub-module 462 may, for example and without limitation, implement various aspects of method steps 134 and 290 illustrated in FIGS. 1-2 and discussed previously. For example, the motion estimation sub-module 462 may generate a signal indicate of relative displacement (or movement) of the image relative to the reference image. Such a signal may, for example, comprise information of direction and distance of the image relative to the reference image.

The motion estimation sub-module 462 may, for example, analyze the image relative to the reference image in light of a portion or all of the movement directions and/or distances in a set of primary movement directions and/or distances. The motion estimation sub-module 462 may, for example, analyze the image relative to the reference image in light of directions and/or distances that are not in a set of primary movement directions and/or distances. For example, the motion estimation sub-module 462 may first analyze the image relative to the reference image in light of information in the set of primary movement directions and/or distances, and then analyze the image in light of other movement directions and/or distances.

The motion estimation sub-module 462 may, for example, analyze the image relative to the reference image utilizing various movement directions and/or distances until a predetermined accuracy threshold is reached (e.g., a correlation level). Alternatively, for example, the motion estimation sub-module 462 may analyze the image relative to the reference image utilizing a set of various movement directions and/or distances and then compare accuracy indications resulting from the various movement directions and/or distances to determine a best fit.

The motion estimation sub-module 462 may, for example, generate a signal comprising a description of the image relative to the reference image. For example and without limitation, the motion estimation sub-module 462 may implement various aspects of method steps 136 and 295 illustrated in FIGS. 1-2 and discussed previously. Such a signal may, for example, comprise information of the image or sub-images thereof, and information of displacement between the image or sub-images thereof and a corresponding reference image or sub-images thereof.

The encoder module 450 may comprise an information stream generation module 465, which may, for example, form information from the reference image generation module 465 and/or the motion estimation module 460 into an information or data stream. The information stream generation module 465 may, for example, utilize the communication module 470 to communicate the information stream to another device or system.

The encoder module 450 may, for example, comprise a graphics-processing module 475. The graphics processing module 475 may, for example, implement the various graphics processing discussed previously with regard to the methods 100, 200 shown in FIGS. 1-2 (e.g., method steps 140 and 298).

The graphics processing module 475 may, for example, determine graphical image information. The graphics processing module 475 may, for example, compare graphical image portions of an image and a reference image to determine movement between the graphical portion of the image and the reference image. The graphics processing module 475 may then, for example, generate a signal comprising information indicative of the movement of the graphical portion of the image relative to a corresponding graphical portion of the reference image.

The information stream generation module 465 may, for example, combine graphics information from the graphics-processing module 475 with image information from the reference image generation module 455 and motion estimation module 460. Alternatively, for example, the information stream generation module 465 may utilize the communication module 470 to communicate a graphics information stream separate from the image information stream that comprises information from the reference image generation module 455 and the motion estimation module 460.

Figure 5:
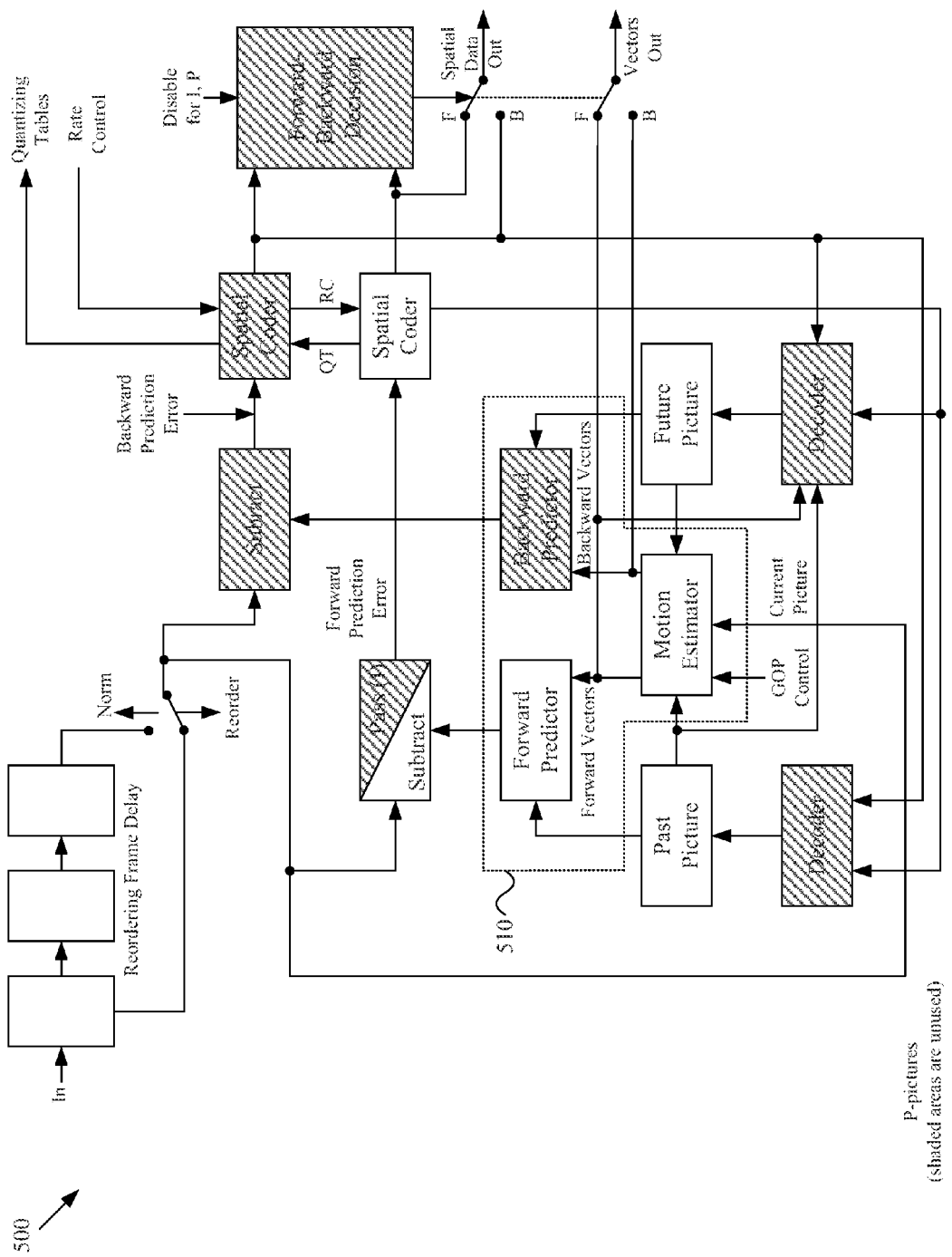
FIG. 5 is a diagram showing an exemplary MPEG encoder for performing application based adaptive encoding, in accordance with various aspects of the present invention.

FIG. 5 is a diagram showing an exemplary MPEG encoder 500 for performing application based adaptive encoding, in accordance with various aspects of the present invention. The exemplary MPEG encoder 500 may, for example, incorporate various components and/or implement various functionality as described previously and shown in FIGS. 1-4. For example, the forward predictor, backward predictor, and motion estimator blocks included in module 510 may incorporate various components and/or implement various operations discussed previously and shown in FIGS. 1-4.

The various modules and components discussed in the previous discussion may, for example be implemented in hardware, software, or a combination thereof. For example and without limitation, the various modules discussed previously may be integrated in a single integrated circuit, or may, for example, be implemented utilizing a processor executing software or firmware instructions. Accordingly, the scope of various aspects of the present invention should by no means be limited by characteristics of particular hardware or software utilization or implementations of various aspects of the present invention.

In summary, aspects of the present invention provide a system and method for encoding dynamic image information for an image generated by a computer application executing on a processor. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for encoding dynamic image information for an image generated by a computer application, the method comprising:
    performing by one or more processors and/or circuits in a single chip, functions comprising:
        determining image movement capability being provided to a user by the computer application; and
        determining image movement information describing an image generated, at least in part, by the computer application, said image movement information comprising information indicative of movement between the image and a reference image,
        wherein said determining image movement information comprises determining the image movement information based, at least in part, on the image movement capability being provided to the user by the computer application.

2. The method of claim 1, wherein the image movement capability comprises scrolling capability being provided to the user by the computer application.

3. The method of claim 1, wherein said determining of said image movement capability comprises determining the image movement capability based, at least in part, on how much of a document image is currently being presented to the user.

4. The method of claim 1, wherein said determining of said image movement information comprises determining, based at least in part on the determined image movement capability being provided to the user by the computer application, a set of one or more primary movement directions for describing the image relative to the reference image.

5. The method of claim 4, wherein said determining of said image movement information comprises analyzing the difference between the image and the reference image using at least one of the set of one or more primary movement directions.

6. The method of claim 4, wherein the set of one or more primary movement directions comprises a prioritized list of one or more primary movement directions.

7. The method of claim 6, wherein the order of movement directions in the prioritized list of one or more primary movement directions is based on respective likelihood of the image being displaced relative to the reference image in each of the primary movement directions in the prioritized list of one or more primary movement directions.

8. The method of claim 1, wherein said determining of said image movement information comprises determining, based at least in part on the determined image movement capability being provided to the user by the computer application, a set of one or more primary movement distances for describing the image relative to the reference image.

9. The method of claim 8, wherein said determining of said image movement information comprises analyzing the difference between the image and the reference image using at least one of the set of one or more primary movement distances.

10. The method of claim 8, wherein the set of one or more primary movement distances comprises a prioritized list of one or more primary movement distances.

11. The method of claim 10, wherein the order of movement distances in the prioritized list of one or more primary movement distances is based on respective likelihood of the image being displaced relative to the reference image in each of the primary movement distances in the prioritized list of one or more primary movement distances.

12. The method of claim 1, wherein said determining of said image movement information comprises determining the image movement information based, at least in part, on the manner in which a user of the computer application is interacting with the computer application.

13. The method of claim 12, wherein said determining image movement information comprises determining the image movement information based, at least in part, on the direction in which a user of the computer application is scrolling through a document.

14. An encoder module for encoding dynamic image information for an image generated by a computer application, the encoder module comprising:
    at least one component comprising one or more processors and/or circuits within a single chip, wherein the at least one component is operable to, at least:
        determine image movement capability being provided to a user by the computer application; and
        determine image movement information describing an image generated, at least in part, by the computer application, said image movement information comprising information indicative of movement between the image and a reference image,
        wherein the at least one component is operable to determine the image movement information based, at least in part, on the image movement capability being provided to the user by the computer application.

15. The encoder module of claim 14, wherein the image movement capability comprises scrolling capability being provided to the user by the computer application.

16. The encoder module of claim 14, wherein the at least one component is operable to determine said image movement capability by, at least in part, operating to determine the image movement capability based, at least in part, on how much of a document image is currently being presented to the user.

17. The encoder module of claim 14, wherein the at least one component is operable to determine said image movement information by, at least in part, operating to determine, based at least in part on the determined image movement capability being provided to the user by the computer application, a set of one or more primary movement directions for describing the image relative to the reference image.

18. The encoder module of claim 17, wherein the at least one component is operable to determine said image movement information by, at least in part, operating to analyze the difference between the image and the reference image using at least one of the set of one or more primary movement directions.

19. The encoder module of claim 17, wherein the set of one or more primary movement directions comprises a prioritized list of one or more primary movement directions.

20. The encoder module of claim 19, wherein the order of movement directions in the prioritized list of one or more primary movement directions is based on respective likelihood of the image being displaced relative to the reference image in each of the primary movement directions in the prioritized list of one or more primary movement directions.

21. The encoder module of claim 14, wherein the at least one component is operable to determine said image movement information by, at least in part, operating to determine, based at least in part on the determined image movement capability being provided to the user by the computer application, a set of one or more primary movement distances for describing the image relative to the reference image.

22. The encoder module of claim 21, wherein the at least one component is operable to determine said image movement information by, at least in part, operating to analyze the difference between the image and the reference image using at least one of the set of one or more primary movement distances.

23. The encoder module of claim 21, wherein the set of one or more primary movement distances comprises a prioritized list of one or more primary movement distances.

24. The encoder module of claim 23, wherein the order of movement distances in the prioritized list of one or more primary movement distances is based on respective likelihood of the image being displaced relative to the reference image in each of the primary movement distances in the prioritized list of one or more primary movement distances.

25. The encoder module of claim 14, wherein the at least one component is operable to determine said image movement information by, at least in part, operating to determine the image movement information based, at least in part, on the manner in which a user of the computer application is interacting with the computer application.

26. The encoder module of claim 25, wherein the at least one component is operable to determine said image movement information by, at least in part, operating to determine the image movement information based, at least in part, on the direction in which a user of the computer application is scrolling through a document.

* * * * *